United States Patent [19]

Holiday, deceased et al.

[11] Patent Number: 4,499,155

[45] Date of Patent: Feb. 12, 1985

[54] ARTICLE MADE FROM SHEET HAVING A CONTROLLED CRYSTALLOGRAPHIC ORIENTATION

[75] Inventors: Paul R. Holiday, deceased, late of Manchester, Conn.; by Suzanne N. Holiday, executrix, Point Pleasant Beach; Bernard H. Kear, Whitehouse Station, both of N.J.

[73] Assignee: United Technologies Corporation, Hartford, Conn.

[21] Appl. No.: 452,675

[22] Filed: Jul. 25, 1983

[51] Int. Cl.³ .............................................. C22F 1/10
[52] U.S. Cl. .................................. 428/586; 428/611; 428/680; 148/426; 148/39
[58] Field of Search ............... 428/579, 586, 610, 680, 428/593, 611, 600, 602; 148/426, 427, 428, 429, 404, 11.5 N, 39, 410, 409

[56] References Cited

U.S. PATENT DOCUMENTS

| | | | |
|---|---|---|---|
| 2,506,393 | 5/1950 | Smoluchowski | 148/11.5 N |
| 2,519,495 | 8/1950 | Nesbitt et al. | 148/11.5 N |
| 3,346,427 | 10/1967 | Baldwin et al. | 148/426 |
| 3,533,860 | 10/1970 | Kench et al. | 428/593 |
| 3,598,169 | 3/1969 | Copley et al. | 164/60 |
| 3,748,721 | 7/1973 | Alexander | 416/241 |
| 3,787,190 | 1/1974 | Giamei et al. | 428/593 |
| 3,872,563 | 3/1975 | Brown et al. | 29/156.8 H |
| 3,967,355 | 7/1976 | Giamei et al. | 29/194 |
| 3,975,219 | 8/1976 | Allen et al. | 148/11.5 P |
| 3,982,973 | 9/1976 | Peters et al. | 148/11.5 N |
| 4,033,792 | 7/1977 | Giamei et al. | 416/241 R |
| 4,184,900 | 1/1980 | Erickson et al. | 148/32 |
| 4,209,348 | 6/1980 | Duhl et al. | 148/3 |
| 4,339,287 | 7/1982 | Matsumoto et al. | 148/111 |

FOREIGN PATENT DOCUMENTS 2110241A  6/1983  United Kingdom ............... 148/404

*Primary Examiner*—L. Dewayne Rutledge
*Assistant Examiner*—John J. Zimmerman
*Attorney, Agent, or Firm*—C. G. Nessler

[57] ABSTRACT

Articles are made of coiled metal sheet which has been thermal mechanically worked so it has a particular texture or crystallographic orientation dominant along its length. The sheet is wound around a mandrel to form a coil and the coil is then hot isostatically bonded to make a monolithic circular article. The article has a circumferential crystallographic orientation which corresponds with that which dominates the length of the sheet.

7 Claims, 4 Drawing Figures

ARTICLE MADE FROM SHEET HAVING A CONTROLLED CRYSTALLOGRAPHIC ORIENTATION

BACKGROUND

1. The present invention relates to monolithic articles made from sheets of metal having preferred crystallographic orientations.

2. It has long been recognized by mechanical designers and materials engineers that many structures require different material properties at different locations. A common solution to this problem is to join dissimilar materials, such as by welding or brazing. Another approach has been to process the different parts of the structure in different ways, such as by heat treating one portion of a structure in a different manner from another portion of the structure. It has long been known that mechanical working of metals will induce in the resultant articles metallurgical structures which provide altered properties. This knowledge is often employed to advantage in the hot and cold working of metals to alter their grain structures.

Anisotropic properties are obtained in various wrought, cast and composite materials. Anisotropy is used to advantage in an article if the preferred properties' direction can be aligned with the critical forces to which the article is subject.

Erickson et al in U.S. Pat. No. 4,184,900 "Control of Microstructure in Cast Eutectic Articles" discloses a directionally solidified eutectic article having microstructure which varies along the length of the article, to provide different properties in the root and airfoil of a blade. In the Erickson et al invention, the microstructure is controlled by varying the solidification rate. U.S. Pat. No. 3,598,169 to Copley et al discloses a directionally solidified cast disk which has a crystallographic orientation which varies around the periphery of the disk. U.S. Pat. No. 3,967,355 "Composite Single Crystal Article" granted to Giamei and Kear, describes how a gas turbine airfoil is made by bonding anisotropic single crystal segments. Such segments can be bonded to isotropic polycrystalline materials as well to provide varied properties. All the foregoing patents are assigned to the present assignee.

Thus, it can be said that there are many ways in which the anisotropic properties of a monolithic cast metal article can be tailored to a particular application. However, the aforementioned casting techniques are limited to essentially small articles. Large articles can be made as composite welded assemblies of castings, but they are costly.

Rolling and forging are more suited to large shape manufacture. Still, for axisymmetric structures such as large cylinders and disks which characteristically are heavily used in gas turbine engines, there are few techniques for obtaining desired anisotropic metallurgical structures other than those which naturally result from the conventional forming processes. For instance, in the making of a ring by regular ring-rolling techniques the amount and direction of deformation is limited by commercial equipment and by the interdependence of the ring diameter on the amount of deformation which is applied to the structure as it is expanded.

For high temperature superalloys with which the present invention is particularly concerned, the flexibility in mechanical working and obtaining heat treatment response is often quite limited. One of the reasons for this is that superalloys are by their very nature extremely strong and resistant to deformation. In addition, since they are utilized at high temperatures and under a variety of transient temperature conditions, they must have metallurgical structures which are stable over a wide range. This characteristic limits their response to many conventional processing techniques.

DISCLOSURE OF THE INVENTION

An object of the invention is to make large superalloy metal structures with anisotropic properties. A further object is to provide preferred crystallographic orientations in large axisymmetric circular articles, such as cylinders and disks.

According to the invention, articles are formed of bonded-together sheets or laminae of particular wrought materials. A metal sheer is first thermal mechanically worked in a manner which produces a textured crystallographic structure; that is, a sheet will have a particular dominant crystallographic orientation with respect to its length and width. For example, in face centered cubic nickel superalloy, rolling at elevated temperature can produce a polycrystalline material wherein the <111> crystal axis predominates along the direction in which the rolling was undertaken and the {110} crystal planes predominate in the plane of the sheet. And, a single crystal sheet can be produced which has {100}<100> orientation.

In the invention, an article is made by winding the foregoing sheet around a mandrel to accumulate it as a coil. The shape of the article is determined by the width of the strip (which may vary along its length) and by the number of windings. The accumulated layers are then bonded to one another, such as by using hot isostatic pressing, to form a monolithic structure. The bonding conditions are chosen so that the textured crystallographic structure in the individual laminae is preserved. Therefore, the resultant monolithic structure has anisotropic properties. The crystallographic orientation which lies circumferentially in the disk is that which laid along the length of the sheet. The properties' orientation likewise depends on the sheet.

Wrought recrystallized polycrystalline sheet and single crystal sheets of nickel superalloys, both having known textures, are suited for use in gas turbine structure construction. Other metals may be used as well. Various shaped articles may be formed in the invention but it is most applicable to axisymmetric circular articles such as disks, cylinders, truncated cones and the like. Textured strip which results in a <111> crystallographic orientation lying in the direction of rolling will provide articles having high specific stiffness. For example, cylindrical shafts made in the manner discussed herein can have a 50% increase in specific stiffness compared to shafts made with randomly oriented material currently in use.

The foregoing and other objects, features and advantages of the present invention will become more apparent from the following description of preferred embodiments and accompanying drawings.

BEST MODE FOR CARRYING OUT THE INVENTION

The invention is described in terms of the fabrication of a disk made of a nickel superalloy. However, it will be apparent that the invention will be applicable to other metals and other structural shapes.

Figure 1:
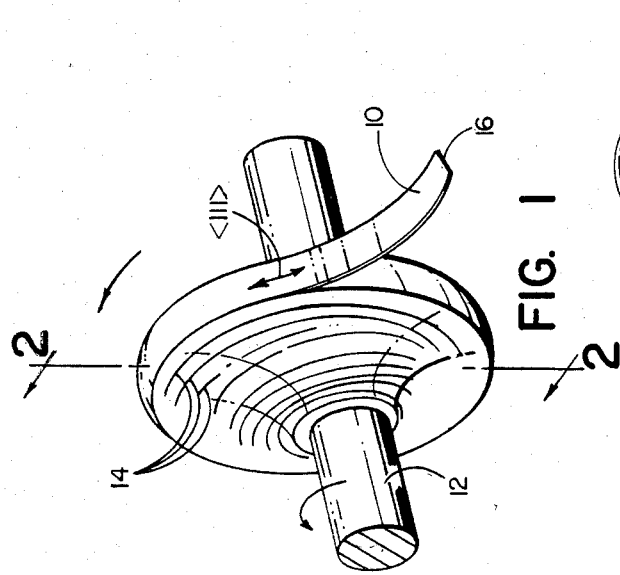
FIG. 1 shows how a disk shaped article is formed by winding sheet around a mandrel.

In the present invention, a disk is made by winding a laminate or sheet 10 around a mandrel 12 as shown in FIG. 1. Techniques for making textured sheet material of nickel superalloys are disclosed in the U.S. patent application No. 325,248 of Chin et al, filed on Nov. 27, 1981, the disclosure of which is hereby incorporated by reference. Such sheets are made from nickel base superalloys having the broad composition range by weight percent 2–9 Al, 0–6 Ti, 0–16 Mo, 0–12 Ta, 0–12 W, 0–4 Cb, 0–20 Cr, 0–20 Co, 0–0.3 C, 0–1 Y, 0–0.3 B, 0–0.3 Zr, 0–2 V, 0–5 Re, balance essentially nickel.

The preferred embodiment of the invention is made using the alloy by weight percent 14.4 Mo, 6.25 W, 6.8 Al, 0.04 C, balance nickel. Alternately, the invention may be made with the alloy comprised by weight percent of 9 Cr, 7 Al, 9.5 W, 3.0 Ta, 1.0 Mo, balance nickel; also useable is the alloy 9 Cr, 6.5 Al, 9.5 W, 1.6 Ta, 1.0 Mo, 0.8 Cb, 0.05 C, 0.01 B, 0.1 Zr, balance nickel and the well known alloy MAR M200. The nickel base alloy is either consolidated from powder or cast with a fine grain structure. The material is then hot worked to the temperature near but below the gamma prime solvus for a reduction in excess of 50%. The material is then cold rolled (at a temperature less than about 1200° F.). The cold rolling is done in a combination of steps. For instance, the sheet may be first straight rolled and second cross rolled at a 90° angle to the straight rolled direction. The amount of deformation is apportioned between the two cold rolling steps so that about 75% of the deformation occurs in the initial straight rolling step. Intermediate annealing is used as needed to prevent cracking. The result of this procedure is the development of a strong {110}<112> texture. This notation means that a significant number of crystals in the sheet (about 4–6 times the number which would occur randomly in untextured sheet made by conventional processes) are oriented so that they have 110 planes parallel to the sheet surface and 112 directions which are parallel to the straight rolling direction.

The next step in making the sheet to be used in the invention is to directionally recrystallize sheets as described in U.S. Pat. No. 3,872,563. The cold rolled sheet described above can be used to reduce directionally recrystallized materials having either <100>, <110> or <111> crystal direction as predominant in the straight rolling direction in the sheet. The term directional recrystallization is a term of art describing the passing of the sheet through a thermal gradient so that the direction of the gradient is, as desired, parallel to the cross roll, straight roll, or other direction. When the thermal gradient is parallel to the cross roll direction, the sheet will have a <111> orientation along the cross roll axis and the <110> axis will lie along the straight roll direction. Perpendicular to the plane of the sheet will be the <112> axis.

In analogous fashion, if the sheet is processed so that the thermal gradient lies parallel to the straight rolled axis, the <110> axes will lie in both the straight roll and cross roll directions while the <100> axis will lie perpendicular to the plane of the sheet.

As shown in FIG. 1, the sheet 10 which has a dominant orientation of <111> along its length is wound around a mandrel 12 to cause the accumulation of a multiplicity of layers 14 coiled around the mandrel. Tension is maintained on the end 16 so that the sheet is tightly wound. As shown in the Figure, the width of the strip is varied along its length in order to vary the shape of the disk which is being created.

Figure 2:
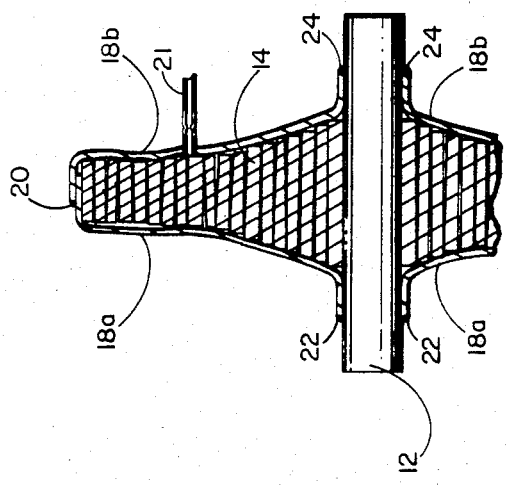
FIG. 2 is an axial cross section through the wound article from FIG. 1 after it has been encapsulated in a metal envelope.
Figure 3:
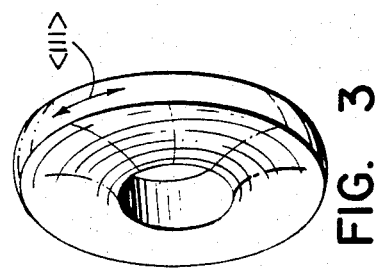
FIG. 3 is a perspective view of the article shown in FIG. 2 after removal of the metal envelope following bonding.

FIG. 2 shows a cross section through the assembly of FIG. 1 to which has been added mating annular segments 18a, 18b welded at joint 20 and to the mandrel 12 at 22, 24 to thereby encapsulate the multiplicity of layers 14 in an impermeable envelope. The envelope 18 is evacuated by means of the tube 21 which is shown after it has been sealed by pinching. The mandrel 12 and envelope parts 18a, 18b are made of a material such as mild steel in a thickness which enables their easy deformation at the elevated temperature of the following operation. The entire article shown in FIG. 2 is placed into a pressure vessel and hot isostatically gas pressed to cause the layers 14 to move into intimate contact and thereby become joined to one another. Such techniques are well known for consolidating and densifying powdered metals and other articles and they are useable for our textured sheet provided the gamma prime solvus temperature is not exceeded. After the hot isostatic pressing, the steel envelope and mandrel are removed by machining or chemical attack. This will produce the article shown in FIG. 3 with the <111> crystallographic orientation running in a circumferential direction. Such an article will have particularly desirable properties in a circumferential direction compared to the same article made of the same alloy in its equiaxed form.

Figure 4:
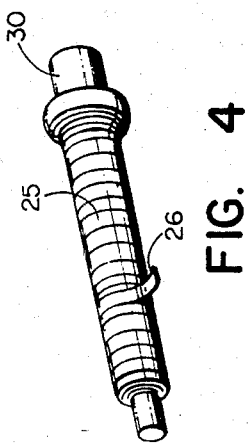
FIG. 4 shows how a hollow shaft is made on a mandrel according to the practice of the invention.

Other axisymmetric articles may be made using the procedure disclosed above. For example, in FIG. 4 a hollow shaft 25 is created by winding sheet 26 progressively along the outer surface of a stepped mandrel 30. Because of the progression of the sheet turns along the length of the shaft, the article shown in FIG. 4 will have a slight bias in circumferential orientation compared to the article shown in FIG. 3. Articles may also be made where the mandrel comprises part of the structure which has end use.

The alloy described above for the preferred practice of the invention is polycrystalline. As is well known, single crystal cast structures can be readily formed by directional solidification. See U.S. Pat. No. 3,494,709 to Piearcey. Such single crystal alloys can be rolled into sheet form under the proper conditions and the resultant sheet would have a known set of orientations. Thus, an article can be made using the techniques described above, wherein the resultant article will be comprised of a single crystal having an orientation which would otherwise be extremely difficult to obtain in a casting. For example, an ingot made of a single crystal alloy having one of the preferred compositions disclosed in U.S. Pat. No. 4,209,348 to Duhl et al (the disclosure of which is hereby incorporated by reference) is hot worked by rolling at a temperature below the gamma prime solvus.

The step of winding the sheet around the mandrel will vary in difficulty according to the properties of the sheet and the temperature at which the operation is carried out. If the winding of the sheet around the mandrel is done at high temperature, the operation should be performed in an inert atmosphere to avoid contamination. Likewise, suitable precautionary steps are taken in all cases to remove surface contaminants in order to obtain proper bonding. See also the aforementioned U.S. Pat. No. 3,967,355 for further information on the bonding of single crystals.

While hot isostatic pressing is preferred, other joining and consolidation techniques familiar to the sheet metal and powder metal fields may be used. For example, a bonding agent such as a braze alloy may be applied between the layers. The transient liquid phase bonding techniques described in various patents to Paulonis et al, such as U.S. Pat. No. 3,678,570, may be utilized as well.

In certain instances, a circular article might be advantageously created with two or more different sets of properties at different radial locations. For example, a gas turbine engine disk desirably has high fatigue resistance at the bore or center and high creep resistance at the rim. In such an instance, a first ultra-fine grained textured strip will be wound around the mandrel, followed by the winding of a second coarse grained textured strip of identical orientation. Using suitable bonding parameters which do not upset the grain size difference, this will provide a finished bonded assembly which has the most favorable set of properties for the particular location. Similarly, the composition may be varied. Of course, the designer of the foregoing articles must take into account the discontinuity where the structure or material is changed.

Although this invention has been shown and described with respect to a preferred embodiment, it will be understood by those skilled in the art that various changes in form and detail may be made without departing from the spirit and scope of the claimed invention.

What is claimed is:

1. A circular article comprised of a nickel superalloy formed of a wrought textured material made by the steps of
   (a) thermal mechanically working a sheet of metal to provide it with a textured crystallographic structure, said textured structure characterized by a selected crystallographic axis predominating along the length of the sheet, compared to random crystallographic orientation;
   (b) winding the length of the sheet around a mandrel to form an article thereabouts, the article comprised of multiple wound layers;
   (c) bonding the wound sheet layers to one another to form a monolithic article having a circumferential orientation corresponding with the selected crystallographic orientation which predominated along the length of the sheet.

2. The article of claim 1 characterized by placing the wound sheet and mandrel formed at step (b) in an evacuated envelope of material impermeable to gas and then bonding the sheet to itself by applying isostatic pressure to the exterior of the envelope at an elevated temperature.

3. The article of claim 1 made of nickel base alloy.

4. The article of claim 1 having a first grain size near the center or first wound portion and a second grain size larger than the first grain size at the outermost or last wound portion, made by winding around a mandrel a first portion of sheet having a first fine grain size, followed by winding a second portion having a second coarser grain size.

5. The article of claim 1 wherein the width of the sheet being wound is varied to thereby form a circular article which has varying axial thickness.

6. The article of claim 1 in the shape of a gas turbine disk.

7. The article of claim 1 in the shape of a shaft.

* * * * *